June 7, 1932. L. B. JONES 1,862,018
PROCESS FOR MAKING GAS FROM OIL
Filed July 15, 1925
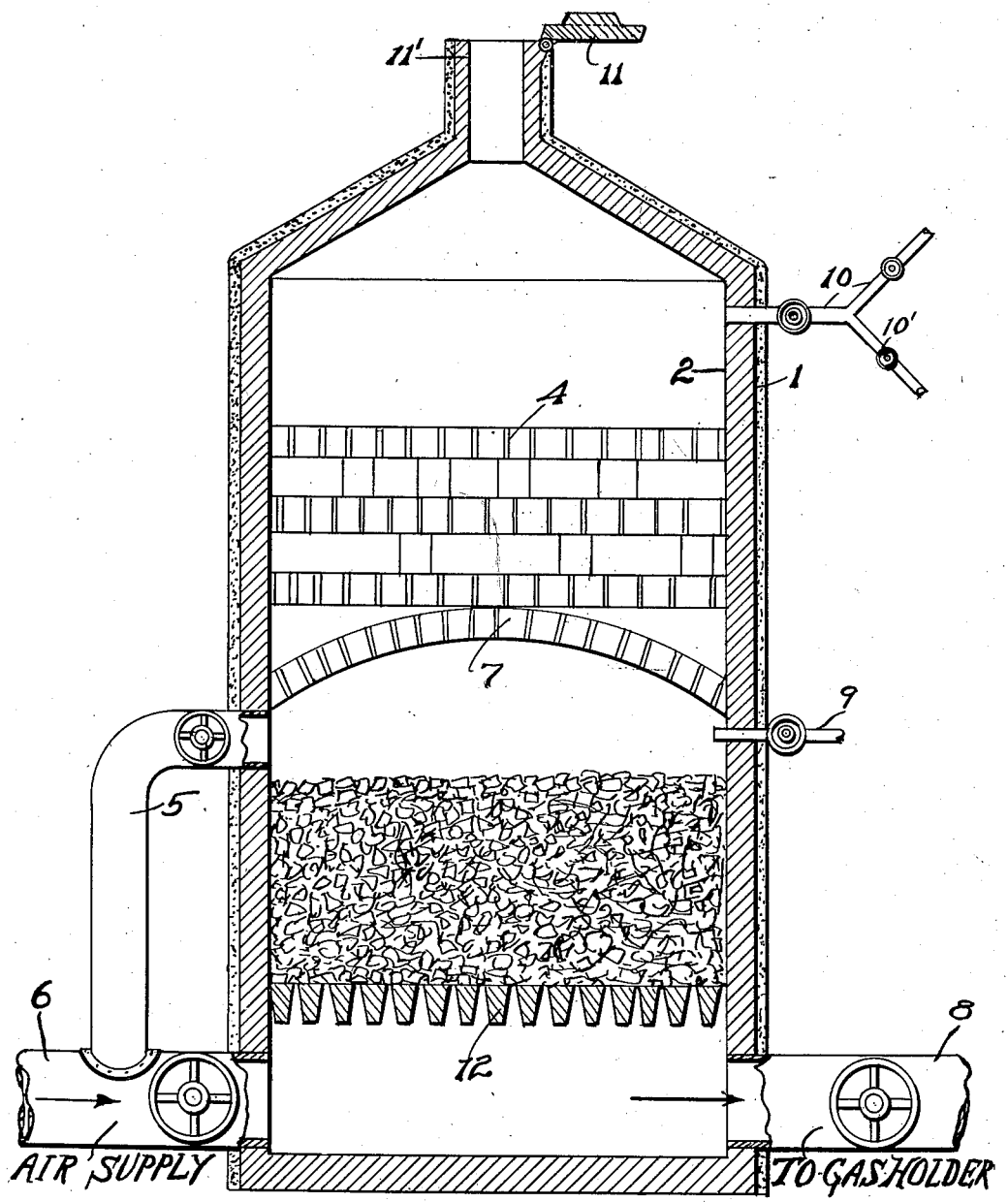
INVENTOR.
Leon B. Jones.
BY
Carlos P. Griffin
ATTORNEY.

Patented June 7, 1932

1,862,018

UNITED STATES PATENT OFFICE

LEON B. JONES, OF SAN FRANCISCO, CALIFORNIA, ASSIGNOR TO JONES GAS PROCESS CORPORATION, A CORPORATION OF CALIFORNIA

PROCESS FOR MAKING GAS FROM OIL

Application filed July 15, 1925. Serial No. 43,667.

This invention relates to the manufacture of gas from oil, or other liquid hydrocarbon, for domestic and industrial use and constitutes an improvement on processes used in the present state of the art.

Oil and other liquid hydrocarbons are extensively used for the production of commercial gas for domestic and industrial use. The destructive distillation of liquid hydrocarbons for the production of gas also results in the production of residual tar or carbon, or both. When producing a commercial gas to meet the requirements of domestic and industrial appliances the carbon or lampblack residuum represents a considerable part of the oil or other liquid hydrocarbon, requires removal from the gas by expensive and troublesome treatment, followed by expensive separation from the wash water after scrubbing the gas and subsequent drying of the lampblack after which it has no more than a fuel value.

This residual carbon or lampblack now commonly used for boiler fuel in oil gas plants is highly combustible and is capable of being combined when in an incandescent state with steam for the production of desirable commercial gases, commonly known as "water gas".

One object of this invention is to produce a process by which commercial oil gas is manufactured from oil or other liquid hydrocarbon and the carbon and tar residue therefrom which will be hereinafter referred to as gas oil residuum, is retained within the apparatus for subsequent combustion through the admission of air for the production of the necessary heat to carry on the gas making operation or the conversion by dissociation of steam to form water gas, the two operations being adjusted to each other to maintain the carbon filter bed entirely from the gas oil residuum, heat the checkerwork, and use up any surplus carbon in the production of water gas.

Another object of the invention is to so operate the process as to obtain in the same apparatus the full fuel value of the carbon deposited from the oil gas making operation, avoiding the loss of heat in cooling and washing said carbon now common to the processes in use.

Other objects of this invention will be disclosed by the description which is to be given thereof, and the features which are new and upon which I desire to secure Letters Patent will be particularly set forth in the claims.

It is obvious that any liquid hydrocarbon may be used in the oil gas making stage of this gas making process.

Other objects of the invention will appear as the description proceeds.

An embodiment of an apparatus for carrying out the invention is shown in the accompanying drawing, in which the same reference numeral is applied to the same portion throughout, but I am aware that there may be modifications thereof:

The drawing is a central vertical section of one type of apparatus in which this method of gas making may be carried out, but in a commercial plant the several parts of the apparatus may be separately built, though the steps of the process remain the same.

The apparatus as illustrated consists of a shell or container 1, with a refractory lining 2, a set of open arches 7 of refractory material supporting brick or tile 4 of refractory material placed checkerwise.

A gas offtake connection 8 is provided at the bottom of the generator and suitably controlled blast connections 5 and 6 are provided to admit air to support combustion, the pipe 6 passing its air through the fuel bed while the pipe 5 adds enough air to completely burn whatever producer gas may be made, whereby the checkerbrick may be suitably heated.

Near the top of the apparatus suitably controlled oil and steam connections 10 and 10' for introducing oil for gas making are provided and at the top of the apparatus a stack valve 11 is provided for egress of products of combustion. A steam supply pipe 9 just below the arch 7 is also provided.

Just above the pipes 6 and 8 there is a suitable grate 12, on which the oil gas residuum is supported.

Suitable arrangements will be made for relieving the gas produced from dust, but this forms no part of the present invention.

All of the pipes are provided with suitable valves and in a commercial plant all these valves are operated from a single point as the cycle must be kept going continuously, but such arrangement is not claimed or illustrated herein.

When the apparatus is first started, the grate 12 is covered with a mass of combustible material, such as coal or coke, or oil gas residuum upon which is placed a sufficient quantity of finer materials of the same kind to act as a filter in removing any solid carbon or tarry substance from the oil gas produced. This mass is then set afire, and a sufficient quantity of air from the pipe 6 is blown through the grate to generate producer gas which is burned by air admitted through 5 to cause the arches and checkerwork to be heated to a temperature of about 1500° to 1800° F., the products of combustion escaping from the stack 11', as the valve 11 is open at this time. The air is then shut off and valve 11 is then closed. The heated fuel will now be so hot that it would be destructive of the ordinary oil gas, so enough steam is introduced at 9 to cool the heated fuel down to about 1600° F., or to such a temperature as will not seriously injure the oil gas. The water gas produced by the steam in its action on the incandescent fuel passes through the pipe 8 to a gas holder.

As soon as the heated fuel is cooled to the proper temperature of about 1600° F. to prevent the destruction of the oil gas that is to a temperature below the critical temperature of dissociation of said oil gas, the oil is introduced at 10, and the hot bricks cause it to be gasified with the deposition of some carbon and tar, which falls on the top of the heated fuel. This step is continued until the checkerwork is cooled so it will not efficiently gasify the oil any further, whereupon the stack valve 11 will be opened, and the cycle will be repeated. In the meantime the oil gas produced will have been passing to the pipe 8 from the fuel bed.

Since the amount of carbon or carbonaceous material deposited from oil gas making processes is well known and the amount of fuel needed to heat the checkerwork is also well known, it only remains to supply the steam and oil to the apparatus for such times, and in such amounts as will maintain the heated fuel on the grate bars 12 at such a height as to insure its acting as a filter to prevent the carbon and tar from passing into the pipe 8.

After the plant is started in operation the only replenishing of fuel will be from the deposit of carbon made in the oil gas making operation upon the top of the fuel bed used as a filter.

What I claim is as follows, but modifications may be made in carrying out the invention shown in the drawing, and in the above particularly described form thereof, within the purview of the claims herein.

1. An oil gas making process which comprises: blasting a bed of solid carbonaceous fuel in a generator with air to heat the fuel bed to incandescence and thereby producing a combustible gas; burning the combustible gas with secondary air and heating a refractory checkerwork within the generator with the hot products of combustion; passing steam through the incandescent fuel bed and thereby producing water gas; admitting oil to the heated refractory material and thereby producing oil gas; separating the solid impurities from the oil gas by passing the gas downwardly through said fuel bed at a temperature insufficient to decompose the gas, and thereafter repeating the cycle.

2. An oil gas making process which comprises: air blasting a bed of oil gas residuum to heat said residuum and form producer gas; burning the producer gas to heat checker brick; passing steam through the bed of residuum and thereby producing water gas and cooling the fuel bed; admitting oil to the heated checker brick to produce oil gas; separating entrained residuum from the oil gas by passing the gas through said cooled bed of residuum.

3. An oil gas making process which comprises combusting a part of a fuel bed of deposited oil gas residuum to heat refractory material; steaming the fuel bed to provide a filter of sufficiently low temperature to allow oil gas to pass therethrough without dissociation; admitting oil to the heated refractory material to form oil gas; separating oil gas residuum from the oil gas by passing the gas through the cooled filter thereby collecting the residuum entrained with said oil gas on said filter bed for subsequent use as a fuel bed.

4. A self sustaining oil gas making process which comprises: charging an oil gas generator with carbonaceous material to form a fuel bed; blasting the fuel bed with air to form hot gases and heating a checkerwork with the said hot gases; steaming the fuel bed to reduce its temperature so that it may be used as an oil gas filter bed; admitting oil to the heated refractory material thereby producing oil gas; passing the oil gas through the filter bed thereby depositing oil gas residuum entrained in the oil gas on the filter bed for subsequent use as a fuel bed; thereafter continuing the process by successively air blasting and steaming the fuel bed and forming oil gas in the checkerwork, at all times maintaining the fuel bed exclusively with oil gas residuum produced in the process.

In testimony whereof I have hereunto set my hand this 10th day of July, A. D. 1925.

LEON B. JONES.